United States Patent
Kim et al.

(10) Patent No.: US 7,499,110 B2
(45) Date of Patent: Mar. 3, 2009

(54) DISPLAY APPARATUS AND CONTROL METHOD THEREOF

(75) Inventors: Hong-jae Kim, Suwon (KR); Il-ki Min, Anyang (KR); Young-chan Kim, Euiwang (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 376 days.

(21) Appl. No.: 10/842,414

(22) Filed: May 11, 2004

(65) Prior Publication Data

US 2005/0041151 A1    Feb. 24, 2005

(30) Foreign Application Priority Data

Aug. 20, 2003    (KR)    ............ 10-2003-0057669

(51) Int. Cl.
*H04N 5/44* (2006.01)

(52) U.S. Cl. ............ 348/734; 348/552; 348/569

(58) Field of Classification Search ......... 348/569, 348/563–568, 558, 722, 714, 718–719, 552, 348/554–555; 340/825.69; *H04N 5/44*
See application file for complete search history.

(56) References Cited

U.S. PATENT DOCUMENTS

| 5,815,631 | A * | 9/1998 | Sugiyama et al. | 386/46 |
| 6,469,633 | B1 * | 10/2002 | Wachter | 340/825.69 |
| 6,738,101 | B1 * | 5/2004 | Utsunomiya et al. | 348/722 |
| 6,940,562 | B2 * | 9/2005 | Sato | 348/734 |
| 7,038,738 | B2 * | 5/2006 | Kwon | 348/734 |
| 7,071,896 | B2 * | 7/2006 | Uchida et al. | 345/2.3 |

FOREIGN PATENT DOCUMENTS

| CN | 1192624 A | 9/1998 |
| JP | 2-63299 | 3/1990 |
| JP | 7-250299 | 9/1995 |
| JP | 8-87067 | 4/1996 |
| JP | 2001-8115 | 1/2001 |
| JP | 2001-318431 | 11/2001 |
| KR | 1998-66132 | 12/1998 |
| KR | 1999-19921 | 6/1999 |
| KR | 20-231662 | 5/2001 |
| KR | 20-284530 | 7/2002 |
| KR | 2003-29188 | 4/2003 |

OTHER PUBLICATIONS

The First Office Action issued by the State Intellectual Property Office of People's Republic of China in Application No. 200410071356.0 dated Mar. 10, 2006 (total of 15 pages).
Office Action issued Jun. 22, 2005 by Korean Intellectual Property Office.

* cited by examiner

*Primary Examiner*—Trang U Tran
(74) *Attorney, Agent, or Firm*—Staas & Halsey LLP

(57) ABSTRACT

A display apparatus and a method of control of a display apparatus selectively displaying one of a plurality of signals provided from a plurality of external signal sources including receiving a selection signal indicating a selection of one of the external signal sources and supplying power to the display apparatus according to the selection signal of the signal source, and displaying a signal provided by the corresponding signal source. The display apparatus and a control method provide a prompt and easy selection of a desired signal.

13 Claims, 4 Drawing Sheets

DISPLAY APPARATUS AND CONTROL METHOD THEREOF

CROSS-REFERENCE TO RELATED APPLICATIONS

This application claims the benefit of Korean Patent Application No. 2003-57669, filed Aug. 20, 2003, in the Korean Intellectual Property Office, the disclosure of which is incorporated herein by reference.

BACKGROUND OF THE INVENTION

1. Field of the Invention

The present invention relates to a display apparatus and a control method thereof, and more particularly, a display apparatus and a control method providing a prompt and easy selection of a desired signal.

2. Description of the Related Art

A conventional display apparatus, in general, processes a signal from an external signal source and displays it on a screen. The conventional display apparatus is classified as a TV apparatus, processing a TV signal or a VTR (Video Tape Recorder) signal and displaying the TV or TR signal as a video signal, or as a monitor, processing a video signal from a computer and displaying the processed video signal.

Because of marketplace demand, the conventional TV apparatus, capable of processing only one signal, has been improved to permit multi-functioning so as to handle and display various signals from external signal sources by having a plurality of connection ports. The ports are capable of connecting to external signal sources such as a computer main body, a VTR player, a DVD (Digital Video Disk) player, a Digital TV, and the like.

A plurality of channel selection buttons and a signal selection button, selecting one of plural video signals, are provided in a remote control, to control the TV apparatus that is a distance away. Generally, users press a TV/external input signal switch to change the signal sequentially.

If the TV apparatus is connected with a plurality of external signal sources and power is turned off, a user selects a desired external signal source following a process shown in FIG. 1. The user first selects a power button, at operation S110. A signal from the external signal source that was previously selected while the power was being turned off is then displayed, at operation S112. After the user selectively enters a changed external signal source at operation S114, the signal from the changed external signal source is displayed, at operation S116. With a conventional apparatus, the user has to press a TV/external input signal switch continuously until the desired external signal source is sequentially selected.

For example, if the power is turned off while watching a TV mode, the TV mode will be selected when the power is next turned on. However, if the user wants to watch a DVD, the user has to press the TV/external input signal switch continuously until the DVD mode is sequentially selected, i.e., external input ->S-Video ->DTV ->PC ->DVD.

In using a conventional apparatus, the user has to wait while repeatedly pressing the TV/external input signal switch until a desired mode is selected. This selection process is inconvenient and time consuming.

SUMMARY OF THE INVENTION

Accordingly, it is an aspect of the present invention to provide a display apparatus and a control method providing a prompt and easy selection of a desired signal.

The foregoing and/or other aspects of the present invention are also achieved by providing a method to control a display apparatus selectively displaying one of a plurality of signals that are each provided from a plurality of external signal sources including receiving a selection signal, selecting one of the external signal sources, supplying power to the display apparatus according to the selection signal of the signal source, and displaying a signal provided by the corresponding signal source.

According to an aspect of the present invention, the signal includes one of a plurality of signals applied by a video card, a TV signal, a DVD (Digital Versatile Disk) signal, and a VTR (Video Tape Recorder) signal. According to an aspect of the present invention, the signal is an audio signal from one of the plurality of signal sources and displaying the signal includes playing the audio signal.

According to an aspect of the present invention, the control method of a display apparatus includes detecting the selection signal of the signal source provided from a remote control.

According to an aspect of the present invention, the control method of a display apparatus also includes displaying an On Screen Display OSD message indicating a selection result for the signal source when the selection signal of the signal source is entered.

According to an aspect of the present invention, the control method of the display apparatus includes checking whether the selected signal is provided from the selected signal source after the selection signal of the signal source is entered, and displaying an OSD message indicating that a signal is not provided upon the signal not being provided from the selected signal source within a predetermined time.

According to another aspect of the present invention, a display apparatus for selectively displaying one of a plurality of signals each provided from one of a plurality of external signal sources includes a power supply, a selector to select each of the plurality of the external signal sources and a signal processor, to process the signal from the selected signal source. A controller controls the power supply to supply power to the display apparatus, and controls the signal processor to display the signal from the selected signal source that corresponds to a selection made in the selector.

According to an aspect of the present invention, the signal includes one of a signal applied by a video card, a TV signal, a DVD (Digital Versatile Disk) player signal, and a VTR (Video Tape Recorder) signal.

According to an aspect of the present invention, the selector includes key buttons to permit a user to select each of the signal sources, a remote control signal transmitter, and a remote control signal controller to transmit a control signal according to the signal source selected by the key buttons to the display apparatus through the remote control signal transmitter.

According to an aspect of the present invention, the display apparatus further includes an OSD (On Screen Display) generator to generate an OSD signal, and the controller controlling the OSD generator, to display an OSD message presenting a result of the selection for the signal source upon selection of the signal source through the selector.

According to an aspect of the present invention, the controller checks whether the signal is provided from the selected signal source upon selection of the signal source through the selector, and controls the OSD generator to display an error message upon not receiving a signal from the selected signal source after a predetermined time.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of the embodiments, taken in conjunction with the accompany drawings of which.

DETAILED DESCRIPTION OF THE PREFERRED EMBODIMENTS

Figure 1:
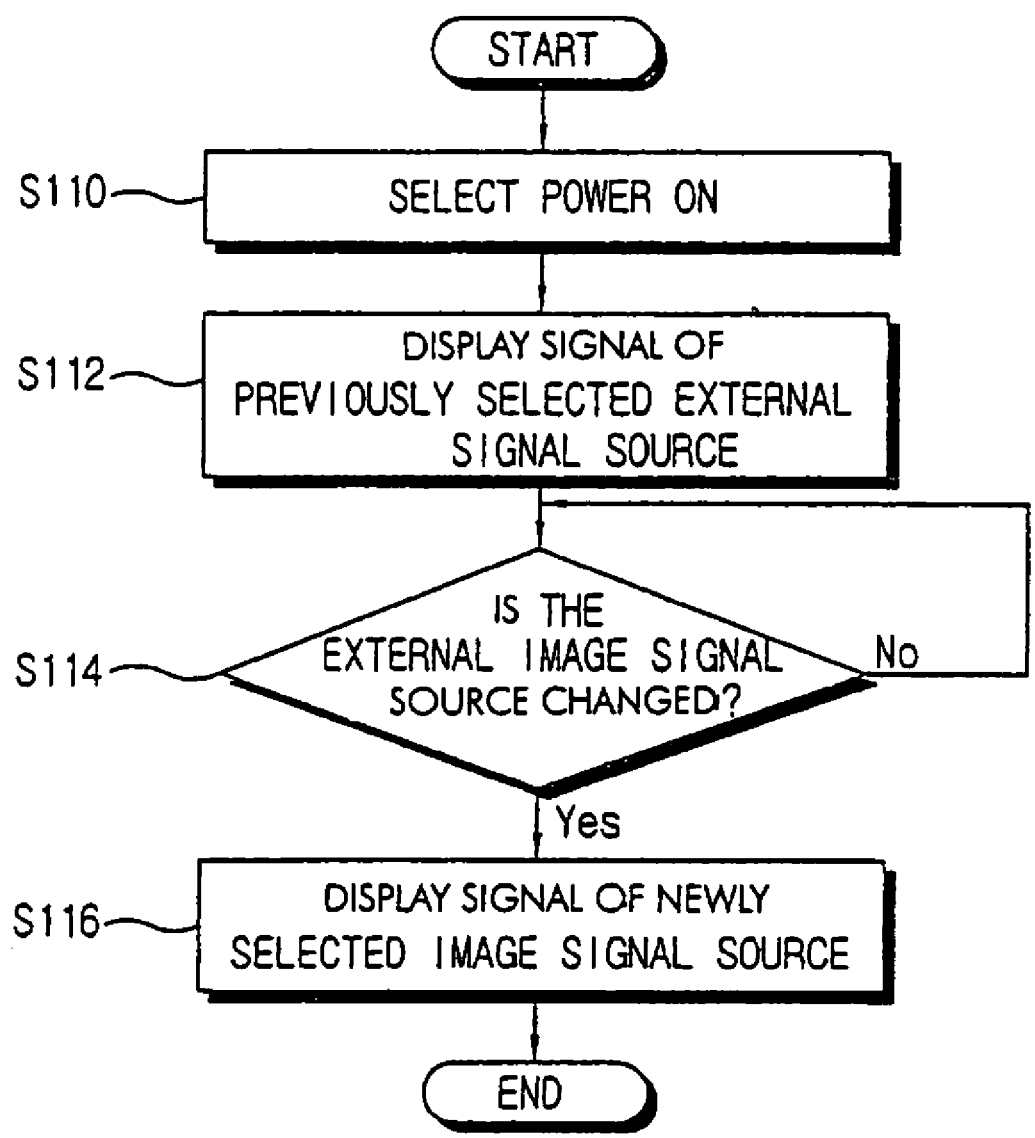
FIG. 1 is a control flow chart of a conventional display apparatus.

Reference will now be made in detail to the embodiments of the present invention, examples of which are illustrated in the accompanying drawings, wherein like reference numerals refer to like elements throughout. The embodiments are described below in order to explain n the present invention by referring to the figures.

Figure 2:
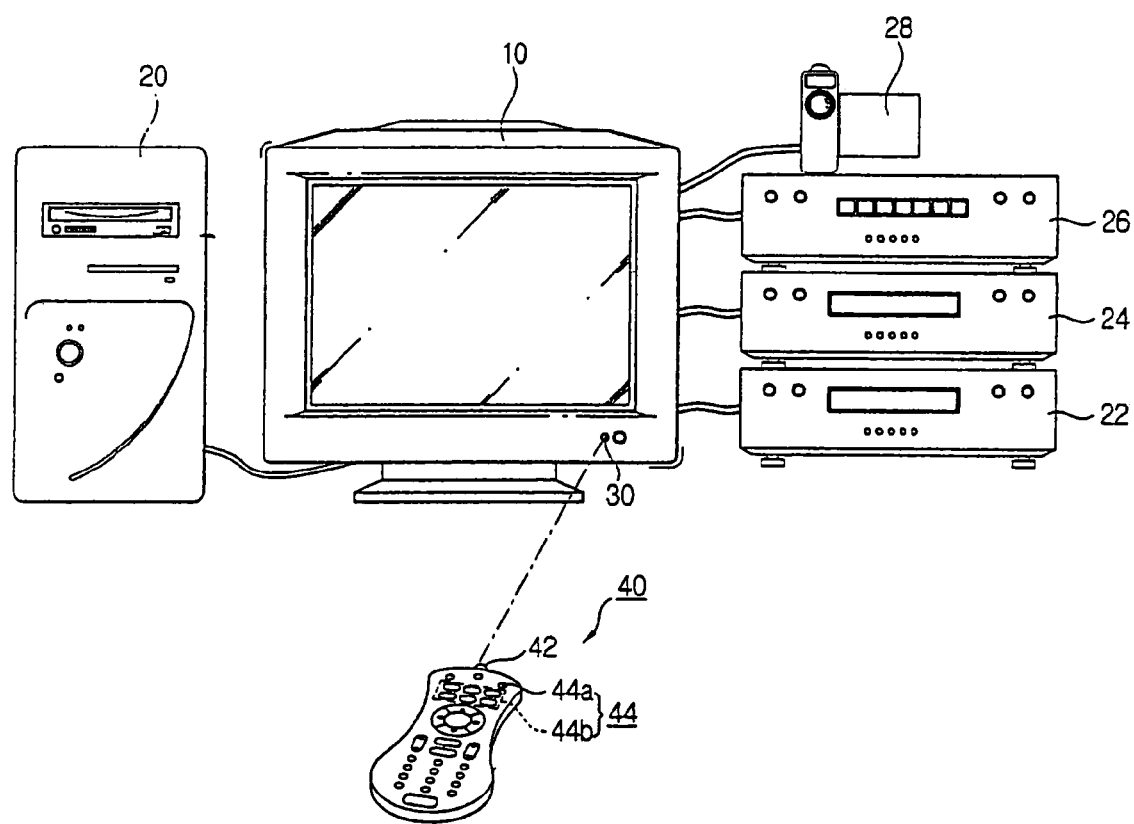
FIG. 2 is a connection configuration of a display apparatus and an external apparatus according to an aspect of the present invention.

FIG. 2 illustrates a connection configuration of a display apparatus and an external apparatus according to an aspect of the present invention. As shown therein, the display apparatus 10 of the present invention includes a plurality of input ports (not shown) connecting a VTR (Video Tape Recorder) 22, a DVD (Digital Versatile Disk) player 24, a Setup-box 26 receiving a DTV (Digital TV) signal, a computer main body 20, and a camcorder 28.

To remotely control the display apparatus 10, a plurality of key buttons 44 are provided in a remote control 40. The key buttons 44 include a power key 44a to turn power on/off, numeral keys (0-9) to select a channel, and a plurality of external signal source keys 44b such as a TV mode key, a DVD mode key, a PC mode key, and the like, to select a mode corresponding to an external input signal.

Figure 3:
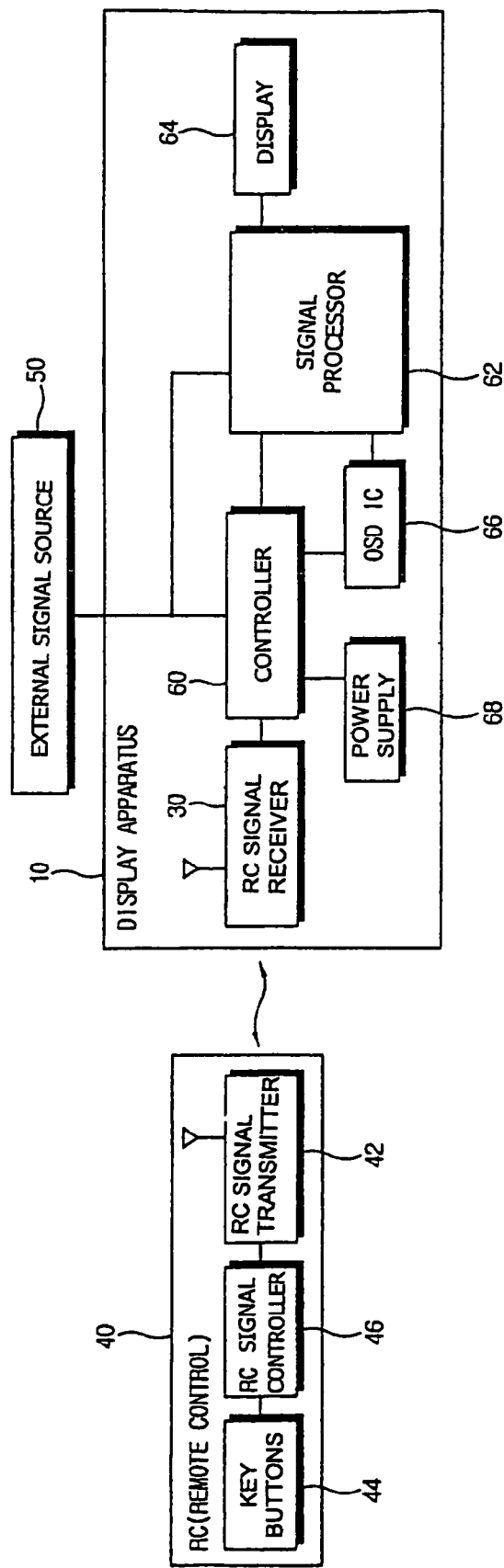
FIG. 3 is a control block diagram of FIG. 2.

FIG. 2 is described in a control block format in FIG. 3. As shown therein, the remote control 40 for the display apparatus 10 includes a plurality of key buttons 44 for a user to enter a key, a remote control signal transmitter 42; and a remote control signal controller 46. A control signal is transmitted to the display apparatus 10 through the remote control signal transmitter 42 to control turning the power of the display apparatus 10 on/off, responding to a key input signal from the key buttons 44, selecting a channel, and selecting one of the external signal sources.

Herein, the remote control signal controller 46 stores a control program that generates a control signal corresponding to each key input signal from the key buttons 44. The control signal is transmitted to the display apparatus 10 through the remote control signal transmitter 42.

The display apparatus 10 further includes a remote control signal receiver 30 to receive the remote control signal from the remote control 40. The display apparatus also includes a signal processor 62 to process each of the different signals provided by the external signal sources 50 such as the VTR 22, the DVD player 24, and the computer main body 20, and the like. The apparatus also includes a power supply 68, an OSD IC (On Screen Display Integrated Circuit) 66 to generate an OSD signal. A controller 60 controls the signal processor 62, the power supplier 68 and the OSD IC 66 according to the remote control signal received through the remote control signal receiver 30.

The controller 60 controls the supply of power from the power supply 68 to the display apparatus 10 depending on a power control signal received through the remote control signal receiver 30.

If the power of the display apparatus 10 is turned off, and the controller 60 receives a selection signal for an external signal source 50 that is input through the remote control signal receiver 30, the controller 60 controls the power supply 68 so as to supply power to the display apparatus 10. The controller also controls the signal processor 62 to process the signal transmitted from the selected external image signal source 50. The controller then allows the signal to display on a display 64.

Herein, if the selection signal of the external image signal source 50 is received and the display apparatus 10 is powered on, the OSD IC 66 becomes available for operation. The controller 60 controls the OSD IC 66 to generate an OSD signal that presents a result of the selection of the external image signal source 50. The OSD signal, generated by the OSD IC 66, is also processed in the signal processor 62 and displayed in the display 64 as an OSD message by the controller 60.

Alternatively, the controller 60 controls the OSD IC 66 and the signal processor 62 to display an error message if a signal is not provided from the selected external image signal source 50 upon receiving the selection signal of the external image signal source 50 within a predetermined time.

Figure 4:
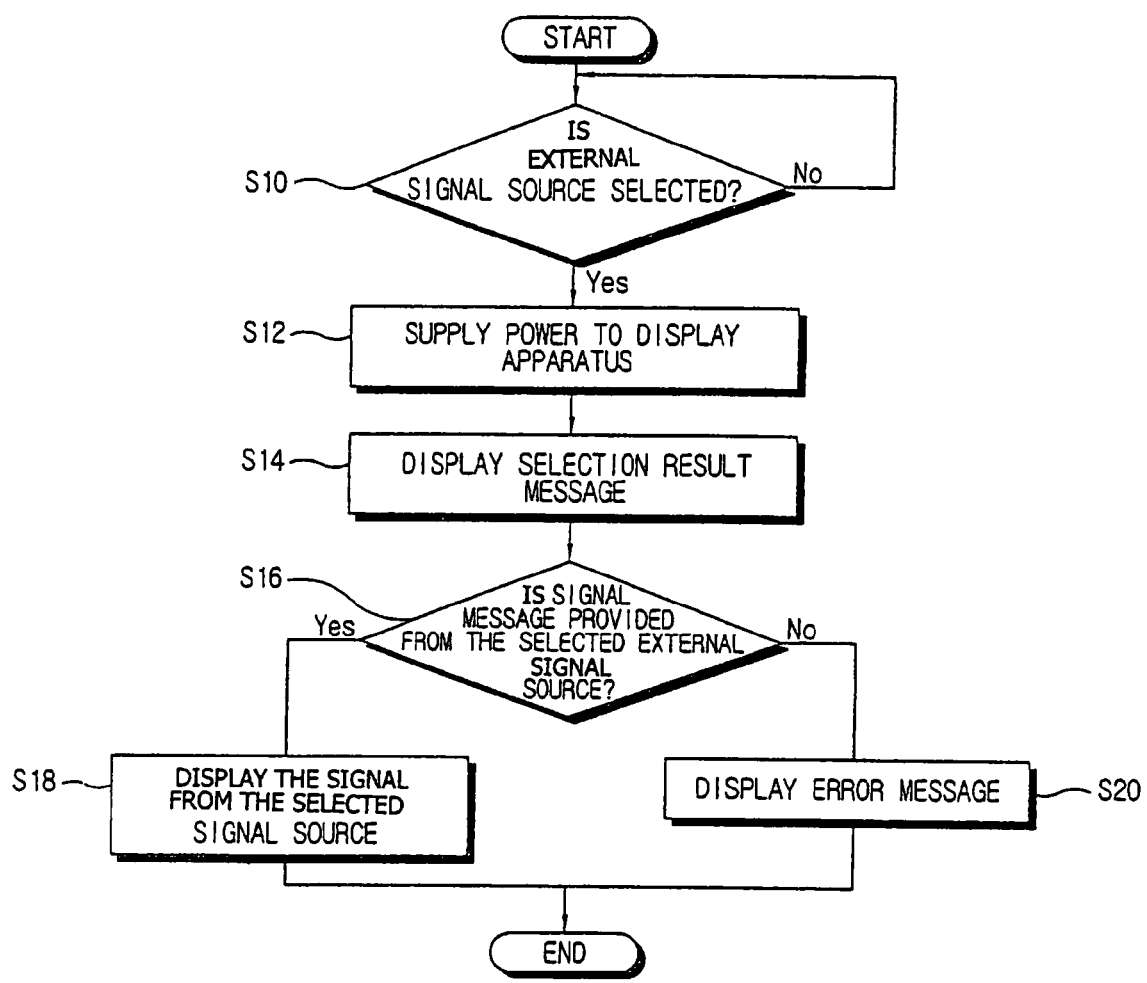
FIG. 4 is a control flow chart of the display apparatus according to an aspect of the present invention.

According to other aspects of the invention, at least one of the controller 60 or the RC signal controller 46 is a computer implementing the method in FIG. 4 using data encoded on a computer-readable medium.

A control flow of the display apparatus 10, according to an aspect of the present invention is shown in FIG. 4. As shown therein, an external image signal source is selected and a selection signal is transmitted based on the selected external image signal source, at operation S10. The controller 60 controls the power supply 68 to supply power to the display apparatus 10, at operation S12, upon receiving the selection signal through the remote control receiver 30. The controller 60 then controls the OSD IC 66 and the signal processor 62 to display an OSD message presenting the result of the selection of the external image signal source 50, at operation S14. At operation S16, the controller 60 determines whether the signal is provided from the selected external image signal source 50, and controls the signal processor 62 so as to process the signal provided from the selected external image signal source for display, at operation S18. However, if a signal is not provided from the selected external image signal source 50 within a predetermined time, the controller 60 controls the OSD IC 66 and the signal processor 62 to display an OSD error message, at operation S20. The operation S12 is skipped if the display apparatus 10 is already powered on.

As described above, the display apparatus 10 according to aspects of the present invention provides an easy selection of a desired signal by the controller controlling a supply of power to the display apparatus 10 upon a user selecting a key on the key buttons 44 corresponding to an external image signal source 50, and to display the signal from the external image signal source.

As described above, aspects of the present invention provide a display apparatus and a control method providing a prompt and easy selection of a desired signal.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of control of a display apparatus selectively displaying one of a plurality of signals provided from a plurality of external signal sources, comprising:
   receiving a selection signal to select one of the external signal sources and to be generated by selecting one of a plurality of selection keys which respectively correspond to the plurality of external signal sources,
   wherein the selection signal is capable of receiving from a remote control by a single selection of one of the plurality of selection keys;
   supplying power to the display apparatus according to the received selection signal; and
   displaying a signal provided by the selected signal source corresponding to the selection signal.

2. The method of control of the display apparatus according to claim 1, wherein the plurality of signals includes a signal applied by at least one of a video card, a TV video signal, a DVD (Digital Versatile Display Disk) video signal, and a VTR (Video Tape Recorder) video signal.

3. The method of control of the display apparatus according to claim 1, further comprising displaying an On Screen Display (ODS) message presenting a selection result of the signal source when the selection signal of the signal source is entered.

4. The method of control of the display apparatus according to claim 3, further comprising:
   checking whether the signal is provided from the selected signal source; and
   displaying an On Screen Display (OSD) message indicating that the signal from the selected signal source is not provided within a predetermined time.

5. A display apparatus selectively for displaying one of a plurality of signals provided from a plurality of external signal sources, comprising:
   a power supply;
   a selector comprising a plurality of selection keys which respectively correspond to the plurality of external signal sources to select each of the plurality of external signal sources and to generate a selection signal when one of the plurality of selection keys is pressed,
   wherein the selection signal is capable of receiving from a remote control by a single selection of one of the plurality of selection keys;
   a signal processor to process the signal from each of the plurality of external signal sources; and
   a controller to control the power supply to supply power to the display apparatus and to control the signal processor to display the signal from the selected signal source corresponding to the selection signal.

6. The display apparatus according to claim 5, wherein the signal includes one of a video signal applied by a video card, a TV video signal, a DVD (Digital Versatile Display Disk) player video signal, and a VTR (Video Tape Recorder) video signal.

7. The display apparatus according to claim 5, wherein the selector comprises:
   a remote control signal transmitter, and
   a remote control signal controller transmitting a control signal according to a selection of the signal source by the key buttons to the display apparatus through the remote control signal transmitter.

8. The display apparatus according to claim 5, further comprising an On Screen Display (OSD) generator to generate an OSD signal, wherein the controller controls the OSD generator to display an OSD message presenting a result of the selection for the signal source when the signal source is selected through the selector.

9. The display apparatus according to claim 8, wherein the controller checks whether the signal is provided from the selected signal source when the signal source is selected through the selector, and controls the OSD generator to display an error message upon the signal not being provided within a predetermined time.

10. A computer-readable medium encoded with processing instructions implementing a method of control of a display apparatus selectively displaying one of a plurality of signals provided from a plurality of external signal sources, the method comprising:
    receiving a selection signal to select one of the external signal sources and to be generated by selecting one of a plurality of selection keys which respectively correspond to the plurality of external signal sources,
    wherein the selection signal is capable of receiving from a remote control by a single selection of one of the plurality of selection keys;
    supplying power to the display apparatus according to the received selection signal; and
    displaying a signal provided by the selected signal source corresponding to the selection signal.

11. The computer-readable medium according to claim 10, wherein the plurality of signals includes a signal applied by at least one of a video card, a TV video signal, a DVD (Digital Display Disk) video signal, and a VTR (Video Tape Recorder) video signal.

12. The computer readable medium according to claim 10, wherein the method further comprises displaying an On Screen Display (OSD) message presenting a selection result of the signal source when the selection signal of the signal source is entered.

13. The computer readable medium according to claim 12, wherein the method further comprises:
    checking whether the signal is provided from the selected signal source; and
    displaying an On Screen Display (OSD) message indicating that the signal from the selected signal source is not provided within a predetermined time.

* * * * *

UNITED STATES PATENT AND TRADEMARK OFFICE
CERTIFICATE OF CORRECTION

| | |
|---|---|
| PATENT NO. | : 7,499,110 B2 |
| APPLICATION NO. | : 10/842414 |
| DATED | : March 3, 2009 |
| INVENTOR(S) | : Hong-jae Kim et al. |

It is certified that error appears in the above-identified patent and that said Letters Patent is hereby corrected as shown below:

Column 5, Line 29, change "(ODS)" to --(OSD)--.

Signed and Sealed this

Nineteenth Day of May, 2009

JOHN DOLL
*Acting Director of the United States Patent and Trademark Office*